Sept. 19, 1961     A. C. DE MELO     3,000,351
DOG MUZZLE
Filed May 27, 1959

Adorico Cabral DeMelo
INVENTOR.

United States Patent Office 3,000,351
Patented Sept. 19, 1961

3,000,351
DOG MUZZLE
Adorico Cabral De Melo, 85 Davis St., Fall River, Mass.
Filed May 27, 1959, Ser. No. 816,119
7 Claims. (Cl. 119—130)

This invention relates to a dog muzzle.

An object of the invention is to provide a structurally novel dog muzzle which is so constructed as to be light in weight and very effective to serve its intended purpose, the dog muzzle adapted to be worn by the dog and providing no injury or discomfort to the animal. In use of the dog muzzle, the animal is able to bark and give an alarm, but it is physically impossible for the dog to bite anyone.

A further object of the invention is to provide a mechanically simple dog muzzle which may be constructed of any suitable rigid material, for example brass, aluminum or plastic. A muzzle in accordance with the invention provides a ring capable of being opened when properly manipulated and absolutely incapable of being opened (without destruction which is not within the ability of the animal) by force exerted in a direction which would be exerted by the dog or other animal opening his mouth in a normal or abnormal way.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
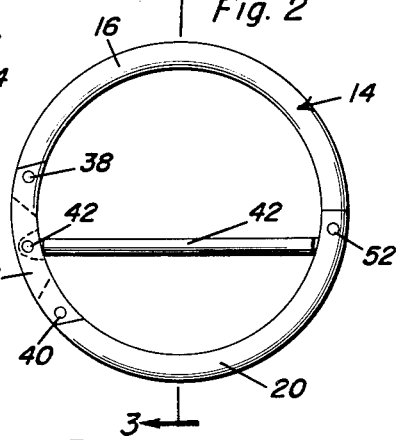
FIGURE 2 is an elevational view of the muzzle.

In the accompanying drawings there is a head 10 of a dog. The dog has muzzle 12 mounted in place where it would be worn by the dog. Muzzle 12 is made of a ring 14 in three sections 16, 18 and 20, each of which is arcuate and preferably circular in cross-section. The end sections 16 and 20 extend for a distance slightly less than 360°, while the intermediate section 18 functions as a link and makes up the difference of the 360° circular configuration shown in FIGURE 2.

Section 16 has a flat tongue 22 at one end thereof which is identical to the flat tongue 24 at the adjacent end of section 20. The section 18 has a bifurcated end 26 and another bifurcated end 28. Tongue 22 is fitted between the furcations of bifurcated end 26, and tongue 24 is fitted between the furcations of bifurcated end 28. The lands 30 and 32 between the furcations of the bifurcated ends constitute stops when engaged by the inner edges 34 and 36 of tongues 22 and 24, i.e. when the muzzle is in the closed position forming the ring as disclosed in FIGURE 2. Pivot pins 38 and 40 are passed through aligned openings in the bifurcated ends of section 18 and through openings in tongues 22 and 24 thereby pivotally connecting sections 16 and 20 to the link section 18.

A bar or bit 42 extending transversely across the ring is mounted on a pivot pin 44 at one end, the pivot pin being carried by the link section 18. Bar 42 preferably has a flattened end fitting in a recess 46 at approximately the center of link section 18, and the pivot pin 44 extends transversely across this recess. Accordingly, link 42 is capable of a limited amount of pivotal movement with reference to link section 18.

Figure 3:
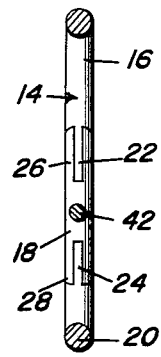
FIGURE 3 is a sectional view taken on the line 3—3 of FIGURE 2.

The opposite end of bar 42 has a flattened tongue 48 which is received in slot or kerf 50 at the end of section 20. Locking pin or keeper 52 extends transversely across slot 50 and is engaged by the latch 54 on the end of section 16. This latch is made of a tongue which has an edge 56 in which there is recess 58 which is snapped over locking pin 52 when the sections 16 and 20 are brought together to form the circular configuration shown in FIGURE 3. The tongue 48 seats in slot 50 and is capable of being moved up and down within the limits of the edges 62 and 64 of slot 50, the lower edge 64 being formed at the deepest part of slot 50 and edge 62 being formed by a shoulder 66 at the juncture of tongue 54 with the remaining part of section 16.

Figure 1:
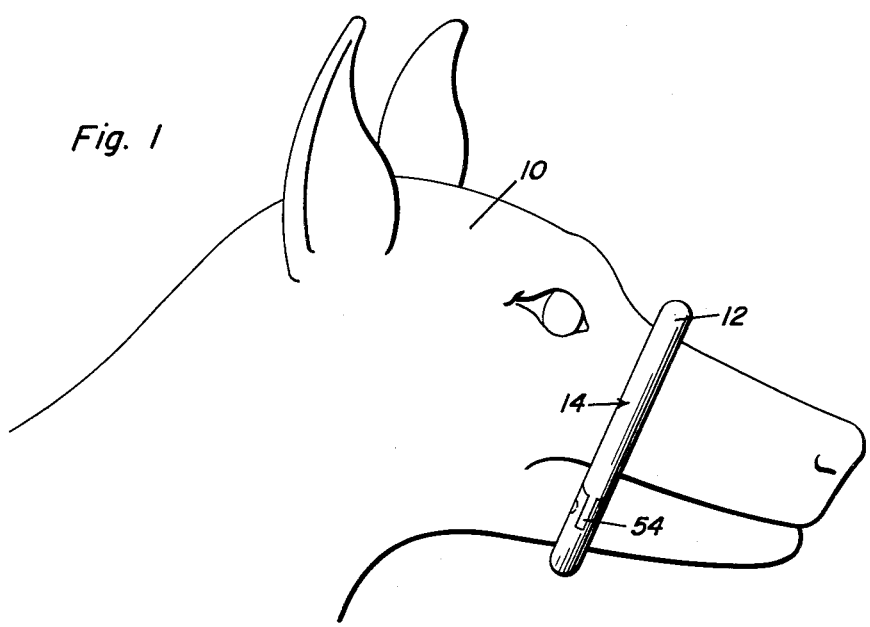
FIGURE 1 is a side elevational view of the head of a dog showing the muzzle in place.
Figure 4:
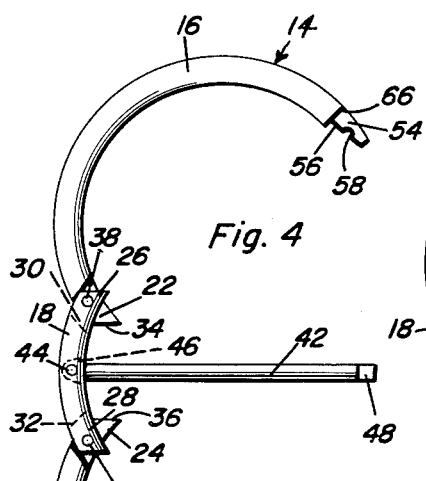
FIGURE 4 is a side elevational view of the muzzle in the open position.

In use, the muzzle is open and placed on the dog as shown in FIGURE 1 with the bar 42 extending transversely across the mouth of the dog.

Figure 5:
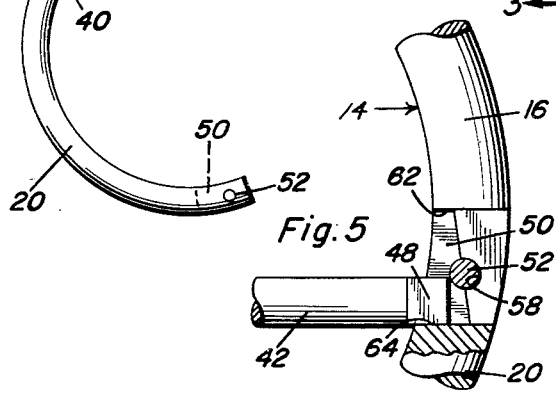
FIGURE 5 is an enlarged fragmentary detail view partially in elevation and partially in section showing the lock of the dog muzzle.

In locking or unlocking the muzzle it is necessary that a force be applied in a direction tending to slide the sections 16 and 20 with reference to each other, that is along axes approximately parallel to the bar 42, and then an additional force is required in a direction to spread the sections apart. It is apparent that the dog is unable to furnish this necessary directional force, the dog being capable only of exerting a force approximately perpendicular to the longitudinal axis of bar 42. In this situation the sections 16 and 20 will not separate but will simply bind tightly by the engagement of notch 58 with locking pin 52 (FIGURE 5).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A muzzle comprising a ring composed of a first section, a second section and a third section, said sections each being essentialy arcuate and when closed forming a closed ring of 360°, said second section constituting a link section, means pivotally connecting the ends of said link section to the adjacent ends of said first and third sections respectively, there being sufficient resilience of the ring to enable said first and third sections to be moved in a sliding manner along a diameter thereof which intersects said second section, a latch at the adjacent confronting ends of said first and third sections respectively, said latch including a tongue and a latch pin engageable with the tongue and said latch release upon said sliding movement of said first and third sections after which said first and third sections may be pivotally moved with respect to said link section, a bar movably connected at one end to said second section and movably connected at the other end to another of said sections adjacent to said latch, said bar adapted to span the mouth of the animal.

2. A muzzle comprising a ring composed of a first section, a second section and a third section, said sections each being essentially arcuate and when closed forming a closed ring of 360°, said second constituting a link section, means pivotally connecting the ends of said link section to the adjacent ends of said first and third sections respectively, there being sufficient resilience of the ring to enable said first and third sections to be moved in a sliding manner along a diameter thereof which intersects said second section, a latch at the adjacent confronting ends of said first and third sections respectively, said latch including a tongue and a latch pin engageable with the tongue and said latch release upon said sliding movement of said first and third sections after which said first and third sections may be pivotally moved with respect to said link section, a bar movably connected at one end to said second section and movably connected at the other end to another of said sections adjacent to said latch, said bar adapted to span the mouth of the animal, said latch including said tongue which has a notch therein engageable with said locking pin, one of said sections having a slot therein within which said tongue is received, and one end of said bar also disposed in a part of said slot thereby constraining the motion of said bar.

3. An animal muzzle comprising a ring including a plurality of sections and means hingedly connecting said sections at one end, a bit mounted in the ring and having one end connected to said means, and common means detachably connecting the other ends of the sections and the other end of the bit together.

4. An animal muzzle comprising a ring including a pair of sections and means hingedly connecting said sections at one end, a bit mounted in the ring and having one end connected to said means, and means detachably connecting the other ends of said sections together with the other end portion of said bit therebetween.

5. An animal muzzle comprising a ring including a pair of sections and means hingedly connecting said sections at one end, a bit mounted in the ring and having one end connected to said means, and means detachably connecting the other ends of said sections together with the other end portion of said bit therebetween, one of said sections having a kerf in said other end portion for receiving said other end portion of said bit, said means including a keeper traversing the kerf, and a latch on said other end of the other section engageable with said keeper in the kerf.

6. An animal muzzle comprising a ring including an intermediate section and a pair of end sections having one end pivotally connected to said intermediate section, a bit mounted in the ring and having one end pivotally connected to the intermediate section, and means for detachably connecting the free ends of the end sections together with the free end of the bit therebetween.

7. An animal muzzle comprising a ring including an intermediate section and a pair of end sections having one end pivotally connected to said intermediate section, a bit mounted in the ring and having one end pivotally connected to the intermediate section, and means for detachably connecting the free ends of the end sections together with the free end of the bit therebetween, one of said end sections having a kerf in its free end portion for receiving the bit, said means including a keeper traversing the kerf, and a latch on the free end of the other end section engageable with said keeper in the kerf.

References Cited in the file of this patent

UNITED STATES PATENTS

| 406,061 | Rea | July 2, 1889 |
| 953,437 | Rexicker | Mar. 29, 1910 |
| 2,771,753 | Sallon | Nov. 27, 1956 |

FOREIGN PATENTS

| 139,986 | Great Britain | Mar. 18, 1920 |